United States Patent
Asaida et al.

(10) Patent No.: US 9,548,477 B2
(45) Date of Patent: Jan. 17, 2017

(54) BATTERY BLOCK

(75) Inventors: Yasuhiro Asaida, Kyoto (JP); Yukio Nishikawa, Osaka (JP); Hideaki Hamada, Hyogo (JP); Naoto Hosotani, Osaka (JP); Daisuke Kishii, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 13/695,194

(22) PCT Filed: Mar. 1, 2012

(86) PCT No.: PCT/JP2012/001406
§ 371 (c)(1),
(2), (4) Date: Oct. 29, 2012

(87) PCT Pub. No.: WO2012/124273
PCT Pub. Date: Sep. 20, 2012

(65) Prior Publication Data
US 2013/0344376 A1 Dec. 26, 2013

(30) Foreign Application Priority Data
Mar. 17, 2011 (JP) .................. 2011-058825

(51) Int. Cl.
*H01M 2/02* (2006.01)
*H01M 2/10* (2006.01)
*H01M 10/6555* (2014.01)

(52) U.S. Cl.
CPC ......... *H01M 2/0242* (2013.01); *H01M 2/0262* (2013.01); *H01M 2/0267* (2013.01);
(Continued)

(58) Field of Classification Search
CPC ...... H01M 10/50; H01M 2/10; H01M 2/1016; H01M 2/105; H01M 2/1094; H01M 2/0242; H01M 10/6555; H01M 2/0262; H01M 2/0267; H01M 2/1077
See application file for complete search history.

(56) References Cited

U.S. PATENT DOCUMENTS 7,019,490 B2  3/2006  Sato
2004/0137323 A1  7/2004  Sato
(Continued)

FOREIGN PATENT DOCUMENTS

CN  1501524 A  6/2001
CN  1805172 A  7/2006
(Continued)

OTHER PUBLICATIONS

International Search Report for Application No. PCT/JP2012/001406 dated Apr. 10, 2012.

*Primary Examiner* — Ula C Ruddock
*Assistant Examiner* — Lisa S Park
(74) *Attorney, Agent, or Firm* — Pearne & Gordon LLP

(57) ABSTRACT

The present invention provides a battery block that accommodates unit cells having higher capacities, and, even in case of abnormal heat generation in the unit cell, does not cause abnormal heat generation in the neighboring unit cells, thereby preventing a chain reaction of degradations and abnormalities of the accommodated unit cells. The battery block of the present invention includes a battery case having a minimum thickness section satisfying the relationship "K2/K1≥K3−1". K1 is the thermal conductance between the battery case and the unit cell. K2 is the thermal conductance of the minimum thickness section of the battery case between two neighboring holes for accommodating the respective unit cells. K3 is a ratio between the abnormal heat temperature of a reference cell and the ambient temperature causing abnormal heat generation in this cell.

12 Claims, 13 Drawing Sheets

(a)

(b)

(52) U.S. Cl.
CPC ....... *H01M 2/1077* (2013.01); *H01M 2/1094* (2013.01); *H01M 10/6555* (2015.04)

(56) References Cited

U.S. PATENT DOCUMENTS

| | | |
|---|---|---|
| 2006/0159984 A1 | 7/2006 | Nagayama et al. |
| 2010/0001737 A1* | 1/2010 | Kubo et al. ................... 324/434 |
| 2010/0028765 A1 | 2/2010 | Doege et al. |
| 2010/0151308 A1 | 6/2010 | Hermann et al. |
| 2011/0159340 A1* | 6/2011 | Hu et al. ....................... 429/120 |

FOREIGN PATENT DOCUMENTS

| | | | |
|---|---|---|---|
| CN | 102005599 A | | 4/2011 |
| EP | 2290731 | * | 3/2011 |
| EP | 2290731 A1 | | 3/2011 |
| JP | 2004-146161 A | | 5/2004 |
| JP | 2006-222066 A | | 8/2006 |
| JP | 2006-339017 A | | 12/2006 |
| JP | 2009-266773 A | | 11/2009 |
| JP | 2011-049011 A | | 3/2011 |

\* cited by examiner (a)

(b)

(a)

(b)

(a)

(b)

(a)

(b)

BATTERY BLOCK

TECHNICAL FIELD

The present invention relates to a battery block where a plurality of cells are accommodated in a battery case.

BACKGROUND ART

Battery blocks, each composed of a plurality of unit cells accommodated in a battery case in such a way as to allow a predetermined current to flow at a predetermined voltage, are widely used as power sources for various applications including various devices and vehicles. A recent trend is the use of technology in which battery blocks are combined into a module and different combinations of modules are used depending on different applications. Furthermore, an improvement in the performance of the unit cell reduces the module's size and weight, as well as improves the working efficiency in the assembling of a battery block. The technology of combining modules offers advantages such as improved flexibility in arranging a power source in a limited space of, for example, a vehicle.

As secondary cells are improved in their performance, it is increasing important to attain the safety of the module in addition to the safety of the unit cell itself. In particular, when the heat of abnormal heat generation due to an internal short circuit or other events in one unit cell is transferred to another unit cell in the module, a normal unit cell also undergoes degradation of characteristics and may cause abnormal heat generation. As a result, this may further trigger a chain reaction of degradations and abnormalities of the accommodated unit cells.

To overcome the foregoing problem, PTL 1 proposes providing a battery case, which is composed of thermally conductive cylinders for accommodating therein secondary cells, with plastic walls formed integrally with the cylinders for preventing thermal runaway. With this method, the walls prevent the radiant heat from transmitting from an abnormally heated secondary cell to nearby secondary cells.

FIG. 17 is a conceptual diagram showing heat transfer in a conventional battery block described in PTL 1.

In FIG. 17, reference signs 1A and 1B each denote a secondary cell. Reference sign 3 denotes a wall made of plastic for preventing thermal runaway. The clearances between the surface of wall 3 and the surfaces of secondary cells 1A and 1B are 0.5 mm or less. The surfaces of secondary cells 1A and 1B are in contact with the surface of wall 3. The thermal conductivity of the plastic forming wall 3 is between 0.05 and 3 W/(m·K) inclusive. The thickness of wall 3 is between 0.5 and mm inclusive. In the battery block, radiation heat from secondary cell 1A to secondary cell 1B is blocked by wall 3. Wall 3 releases the heat generated in secondary cell 1A to secondary cell 1B by conduction. This prevents thermal runaway in neighboring secondary cells.

Battery blocks with improved absorption of heat from unit cells to the battery case have also been known. Examples thereof include battery blocks where the thickness of rows of walls positioned at the central portion of the battery case is made larger than the thickness of those positioned at the peripheral portion (e.g., see PTL 2); battery blocks in which a relationship between the diameter of unit cells accommodated in the battery case and the distance between two neighboring unit cells is specified (e.g., see PTLs 3 and 4); and battery blocks configured to absorb heat generated in unit cells by means of a battery case having a large thermal capacity (e.g., see PTL 5).

Moreover, battery blocks with improved heat releasing from the battery case have been known. Examples thereof include battery blocks having on the outer surface of the battery case a heat radiation layer having a heat radiation capability higher than that of the battery case (e.g., see PTL 6); battery blocks having a thermally conductive layer between the battery case and unit cells (e.g., see PTLs 7 and 8); and battery blocks where the thickness of the battery case is relatively reduced at the central portion for increased heat radiation capability at the central portion (e.g., see PTL 9).

CITATION LIST

Patent Literature

PTL 1: Japanese Patent Application Laid-Open No. 2006-339017.
PTL 2: Japanese Patent Application Laid-Open No. 2011-049011.
PTL 3: Japanese Patent Application Laid-Open No. 2006-222066.
PTL 4: U.S. Patent Application Publication No. 2006/0159984.
PTL 5: U.S. Patent Application Publication No. 2010/0151308.
PTL 6: Japanese Patent Application Laid-Open No. 2009-266773.
PTL 7: Japanese Patent Application Laid-Open No. 2004-146161.
PTL 8: U.S. Pat. No. 7,019,490.
PTL 9: U.S. Patent Application Publication No. 2010/0028765.

SUMMARY OF INVENTION

Technical Problem

However, the market demands a further increase in the capacity of the secondary cells especially for use as a power source of a vehicle. Increase in the capacity of the secondary cells further increases the amount of heat generation in the secondary cell when abnormal heat generation occurs. In a conventional battery block configured such that heat generated in an abnormally heated secondary cell is absorbed by neighboring secondary cells, when the secondary cells have an increased capacity, it is difficult to sufficiently absorb the heat caused by abnormal heat generation in the secondary cell. This resultantly increases the risk of causing thermal runaway in neighboring secondary cells. Also in other conventional battery block, an increased capacity of the accommodated unit cells raises the risk of failing to sufficiently prevent a chain reaction of thermal runaways.

The present invention has been made in view of the above situations. An object of the present invention is to provide a battery block that accommodates therein unit cells having a higher capacity and prevents a chain reaction of degradations and abnormalities of the unit cells even when abnormally heating occurs in the unit cells.

Solution to Problem

In order to achieve the object, the present invention provides the following battery block.

[1] A battery block comprising: a battery case made of metal and having a plurality of holes; and a plurality of unit cells accommodated in the respective holes, wherein a minimum thickness section of the battery case between any two of the holes neighboring each other satisfies the following relationship:

$$K2/K1 \geq K3-1$$

where K1 is a thermal conductance between the unit cell and the battery case,

K2 is a thermal conductance of the minimum thickness section, and

K3 is a ratio of an abnormal heat temperature of a reference cell under room temperature to ambient temperature causing abnormal heat generation in the reference cell under room temperature.

[2] The battery block according to [1],
wherein an arrangement of the plurality of holes is a staggered arrangement,
a shape of the unit cell is a circular cylinder, and
the following relationship expressed by Equation 1 is satisfied:

$$x \geq (\pi^2 \times \alpha \times D^2)/(36 \times \lambda) \times ((T1/T2) \times (A/A0) - 1) \quad \text{(Equation 1)}$$

where A0 (Ah) is a cell capacity of the reference cell,
T1 (K) is the abnormal heat temperature of the reference cell under room temperature,
T2 (K) is ambient temperature causing abnormal heat generation in the reference cell under room temperature,
A (Ah) is a cell capacity of the unit cell,
D (m) is an outer diameter of the unit cell,
$\alpha$ (W/(m$^2$·K)) is a heat transfer coefficient between the unit cell and an inner wall of the hole,
$\lambda$(W/(m·K)) is a thermal conductivity of the battery case, and
x (m) is a thickness of the minimum thickness section.

[3] The battery block according to [1] or [2], wherein a thickness of a peripheral portion of the battery case is larger than a thickness of a central portion of the battery case.

[4] The battery block according to any one of [1] to [3],
wherein the battery case has m rows of the holes, each row having n holes at a peripheral portion, and
a thermal capacity of the peripheral portion of the battery case is equal to a total thermal capacity of 2×(n+m+1) unit cells.

[5] The battery block according to any one of [1] to [4], wherein a thickness of a peripheral portion of the battery case at a center in an axial direction of the hole is larger than a thickness of the peripheral portion at an end in the axial direction.

[6] The battery block according to any one of [1] to [5], wherein the unit cell includes an electrode assembly,
a length of the hole is larger than a length of the electrode assembly, and
at least the entire electrode assembly is accommodated in the hole.

[7] The battery block according to any one of [1] to [6], wherein the battery case comprises a plurality of circular or polygonal cylinders joined to each other, the cylinders each having the holes.

[8] The battery block according to [7], further including:
convex portions arranged on outer walls of the cylinders; and
concave portions arranged on the outer walls of the cylinders, the concave portions being contoured such that the convex portions can be fitted therein.

[9] The battery block according to any one of [1] to [8],
wherein a shape of the hole is a polygon, and
the holes are disposed such that two apexes respectively of any two of the holes neighboring face each other.

[10] The battery block according to any one of [1] to [9], wherein an area of an opening of the hole arranged at a peripheral portion of the battery case is larger than an area of an opening of the hole arranged at a central portion of the battery case.

[11] The battery block according to any one of [1] to [10], wherein the battery case is made of an aluminum alloy.

[12] The battery block according to any one of [1] to [11], wherein the battery case includes at least two different components made of different metallic materials.

[13] The battery block according to any one of [1] to [12], further including an insulating layer that covers an outer surface of the battery case.

In the battery block, the balance between thermal conductivity and the minimum thickness of the battery case is appropriately maintained in conformity with the capacity of the unit cell. Accordingly, even when abnormal heat generation has occurred in a high-capacity unit cell, heat generated in the unit cell can be released so as not to trigger abnormal heat generation in neighboring cells.

Advantageous Effects of Invention

According to the battery block of the present invention, even when abnormal heat generation occurs in accommodated high-capacity unit cells, a chain reaction of degradations and abnormalities of the unit cells can be prevented.

BRIEF DESCRIPTION OF DRAWINGS

FIG. 1(a) is a perspective view schematically showing the battery block, and FIG. 1(b) is a top view schematically showing the battery block;

FIG. 3(a) is an enlarged view of a peripheral portion on a long side of the battery block, FIG. 3(b) is an enlarged view of a peripheral portion on a short side of the battery block, and FIG. 3(c) is an enlarged view of a corner portion of the battery block;

DESCRIPTION OF EMBODIMENTS

Figure 1:
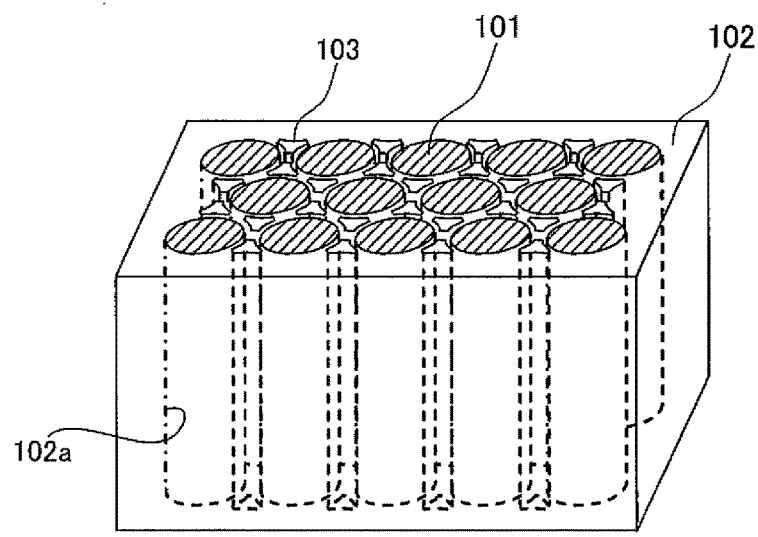
FIGS. 1(a) and 1(b) are diagrams showing a battery block of Embodiment 1.
Figure 1:
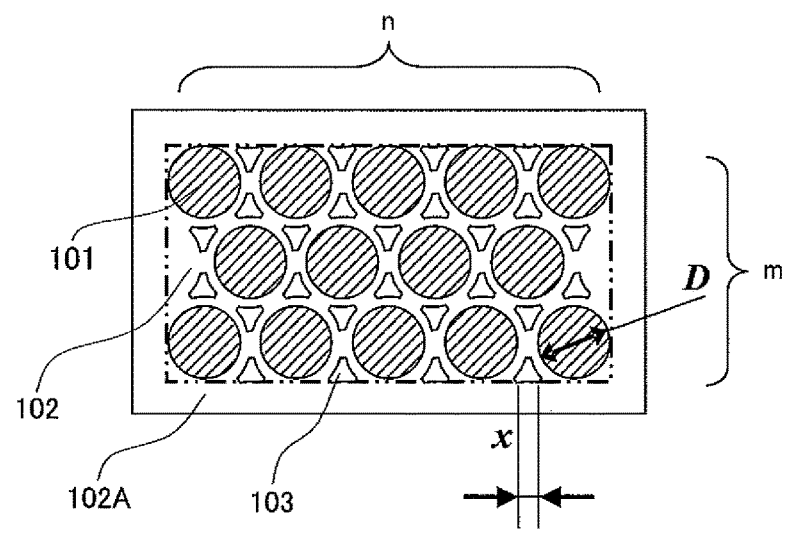

A battery block of the present invention includes a battery case and unit cells.

The battery case is made of metal. The battery case includes a plurality of holes for accommodating therein the respective unit cells. The holes may be either through holes or bottomed holes. The holes may be arranged either in a regular pattern or irregular pattern. The regular arrangement of the holes is, for instance, a lattice arrangement or a staggered arrangement.

The battery case can be constructed by joining together the outer peripheral walls of cylinders having the holes. Instead, the battery case can be constructed by stacking plate-shaped members having a plurality of openings, which form the holes. Instead, the battery case can be constructed by boring the holes in a metal block.

The battery case includes a minimum thickness section. The minimum thickness section is a part of the battery case that is present around the hole and that has a minimum thickness when viewing the battery case in the axial direction of the hole. For instance, the minimum thickness section is a part between the holes of the battery case. When the battery case includes additional holes other than those described above, the minimum thickness section may be a part between the hole and the additional hole of the battery case (see reference sign x in FIGS. 2, 6(b), 8(b), 9(b) and 13).

The battery case has the minimum thickness section satisfying the following relationship $K2/K1 \geq K3-1$.

In general, the amount of heat transfer between two points is found by multiplication of the heat transfer coefficient (unit: W/(m²·K)) on the heat transfer path between the two points, the cross-section area of the heat transfer path (unit: m²), and the difference in temperature between the two points (unit: K).

The heat transfer coefficient represents a capability of heat transfer per unit cross-section area of the heat transfer path (unit: W/(m²·K)). When the heat transfer path is formed in a member made of a single material, the heat transfer coefficient is found by dividing thermal conductivity (unit: W/(m·K)) of the material constituting the heat transfer path by the length (unit: m) of the heat transfer path. When the heat transfer path is formed of two materials (e.g., a metal member and air), the heat transfer coefficient is found by an experiment or calculation.

Thermal conductance (unit: W/K) represents a capability of heat transfer in the heat transfer path between two points. The thermal conductance is found by multiplication of the heat transfer coefficient and the cross-section area of the heat transfer path.

K1 is the thermal conductance between the unit cell and the battery case. K1 represents a capability of heat transfer between the unit cell and the battery case (the solid wiggly arrow in FIG. 2). K1 is found by multiplication of the heat transfer coefficient between the battery case and the unit cell, and the area of the inner wall of the hole.

K2 is the thermal conductance of the minimum thickness section of the battery case between the two holes neighboring each other. K2 represents a capability of transfer of heat in the battery case, the heat having been transferred from the unit cell to the battery case (designated by the broken wiggly arrow in FIG. 2). K2 is found by dividing the thermal conductivity of the material of the battery case by the length of the transfer path of heat being transferred in the battery case, and multiplying the resultant quotient by the cross-section area of the minimum thickness section nearest from the line connecting the two holes neighboring each other.

The ratio of "an abnormal heat temperature in a reference cell under room temperature" to "an ambient temperature causing abnormal heat generation in the reference cell under room temperature" is referred to as K3. The reference cell is of a type identical to that of the unit cell to be accommodated.

The "abnormal heat temperature of the reference cell under room temperature" is a peak temperature of the reference cell when abnormal heat generation occurs from room temperature. The "abnormal heat temperature of the reference cell under room temperature" is found by a nail penetration test which is conducted in an explosion proof apparatus; this test typically includes measurement of the surface temperature of the reference cell with a thermocouple or the like. The nail penetration test is in conformity with a method described in a guideline from the Battery Association of Japan (SBA G1101-1997 "Guideline for Safety Evaluation on Secondary Lithium Cells"). An example of conditions in the nail penetration test is as follows. When the reference cell is a secondary cell, a fully charged reference cell (i.e., 100% charged) is used. The reference cell is penetrated by a nail at the center in a direction crossing the axis of the reference cell. The diameter of the nail is 2.5 to 5.0 mm. The reference cell is allowed to stand for at least 6 hours after the penetration.

Figure 4:
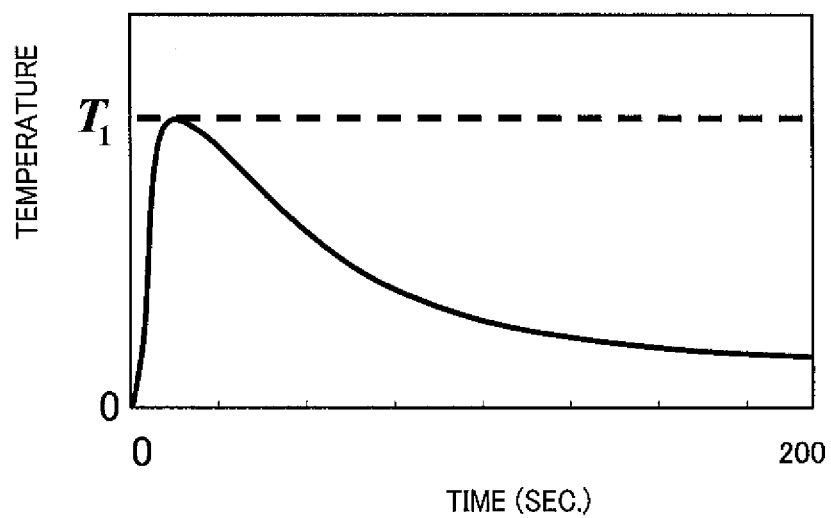
FIG. 4 is a graph showing temperature change when abnormal heat generation occurs in a reference cell.

FIG. 4 is a graph showing an example of a temporal change in the temperature of the reference cell having a cell capacity of A0 (Ah) under the nail penetration test. The horizontal axis represents time from a point when conducting penetration by a nail. The vertical axis represents the surface temperature of the reference cell. The origin of the vertical axis in FIG. 4 is set at room temperature (e.g. 27° C.).

Referring to FIG. 4, the temperature of the reference cell increases up to T1 in several tens of seconds, and decreases in several minutes thereafter. That is, the amount of heat for increasing the temperature of the reference cell to T1 is generated in the several tens of seconds. T1 in FIG. 4 is the "abnormal heat temperature of the reference cell under room temperature".

The "ambient temperature causing abnormal heat generation in the reference cell under room temperature" is a temperature at a change point of a temperature-time curve for the reference cell when the ambient temperature of the reference cell is gradually increased. The "ambient temperature causing abnormal heat generation in the reference cell under room temperature" is found by measuring the temperature curve of the surface of the reference cell while gradually increasing the temperature (e.g., 0.1 to 0.5° C./sec.) in a thermostat bath accommodating the reference cell.

Figure 5:
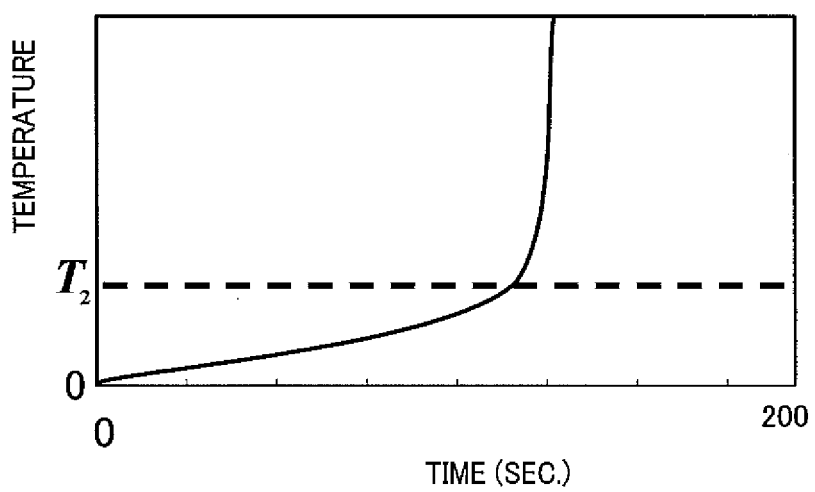
FIG. 5 is a graph showing temperature change when the ambient temperature of the reference cell is changed.

FIG. 5 is a graph showing an example of a change in the surface temperature of the reference cell when the ambient temperature around the reference cell having a cell capacity of A0 (Ah) is increased at a constant rate. The horizontal axis represents time. The vertical axis represents the surface temperature of the reference cell. The origin of the vertical axis in FIG. 5 is set at room temperature (e.g. 27° C.).

Referring to FIG. 5, the surface temperature of the reference cell initially increases with increasing ambient temperature. When the surface temperature of the reference cell reaches T2, the temperature rapidly increases, resulting in abnormal heat generation. T2 in FIG. 5 corresponds to the "ambient temperature causing abnormal heat generation in the reference cell under room temperature."

Figure 2:
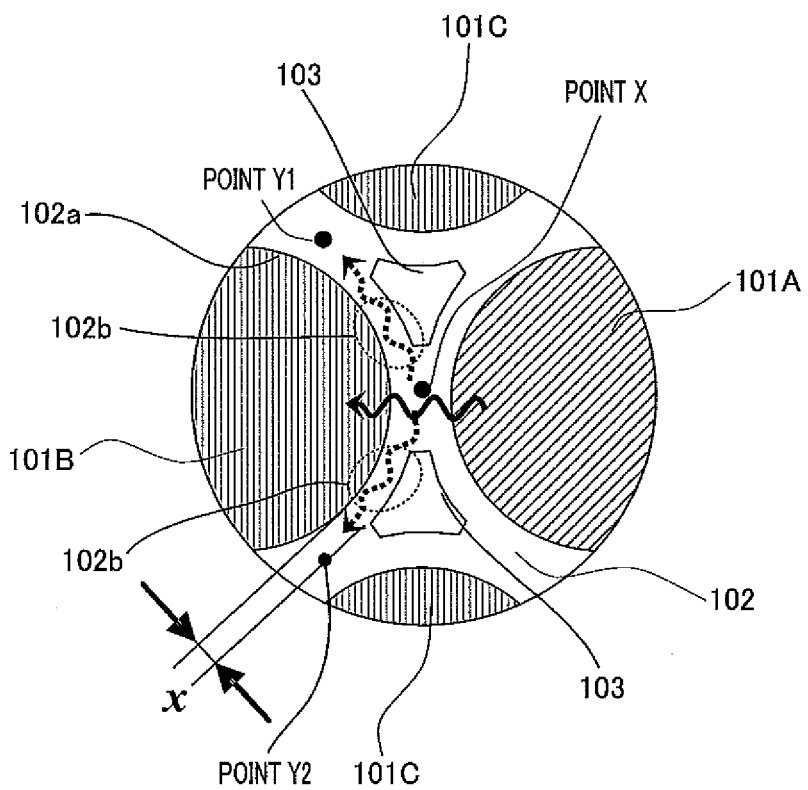
FIG. 2 is an enlarged top view schematically showing the battery block of Embodiment 1.

As shown in FIG. 2, heat from an abnormally heated unit cell transfers toward a neighboring unit cell. Furthermore, the heat from the abnormally heated unit cell transfers in the battery case. Moreover, as apparently shown in FIGS. 4 and 5, when the amount of heat for increasing the surface temperature of the unit cell to T2 has been transferred to the unit cell, abnormal heat generation sometimes occurs in the unit cell. Accordingly, the amount of heat in a certain unit cell heated up to T1 is required to be released to or absorbed by any object other than the neighboring unit cell such that the amount of heat becomes below the level for causing an increase of the temperature of the neighboring unit cell to T2.

More specifically, a ratio of K1 to (K1+K2) is set to 1/K3 or less (i.e., K2/K1≧K3−1). Thus, the amount of heat transferring to the neighboring unit cell can be reduced below the amount of heat that triggers abnormal heat generation. More specifically, K2 is determined in accordance with the thickness of the minimum thickness section. Accordingly, the relation of "K2/K1≧K3−1" is satisfied by appropriately determining the thickness of the minimum thickness section.

It is preferable that the thickness of the minimum thickness section be smaller as long as the relationship "K2/K1≧K3−1" is satisfied, from the viewpoint of increasing the packing density of the accommodated unit cells. Furthermore, it is preferable that the clearance between the hole and the unit cell be smaller as long as the relationship "K2/K1≧K3−1" is satisfied, from the viewpoint of increasing the packing density of the accommodated unit cells. Moreover, it is preferable that a ratio of the area of the opening of the hole to unit area be larger as long as the relationship "K2/K1≧K3−1" is satisfied, from the viewpoint of increasing the packing density of the accommodated unit cells.

The battery case may include an additional configuration other than the above-described configuration as long as the relationship "K2/K1≧K3−1" is satisfied. Examples of such an additional configuration include: a configuration of providing walls of a battery case with appropriate thickness variation; a configuration in which the battery case is composed of at least two components made of different metallic materials; and a configuration in which an insulating layer covering the outer surface of the battery case is provided.

The unit cell is, for instance, a typical secondary cell including an electrode assembly. The electrode assembly includes a positive plate, a negative plate, and an insulating layer arranged between the positive and negative plates, which are wound or stacked.

Embodiments of the present invention will hereinafter be described with reference to drawings.

Embodiment 1

Referring to FIGS. 1 to 6, Embodiment 1 of the present invention will be described.

First, the configuration of a battery block of Embodiment 1 will be described with reference to FIG. 1. FIG. 1(a) is a perspective view schematically showing the battery block of Embodiment 1. FIG. 1(b) is a diagram viewed from above the battery block of FIG. 1(a).

In FIGS. 1(a) and 1(b), reference sign 101 denotes a cylindrical unit cell. Unit cell 101 has a cell capacity of A (Ah). Unit cell 101 has an outer diameter of D (m). Reference sign 102 denotes a battery case for accommodating therein unit cells 101. Battery case 102 includes peripheral portion 102A and a central portion surrounded by peripheral portion 102A. A plurality of circular holes 102a are arranged at the central portion. Hole 102a has a size such that unit cell 101 can be inserted in hole 102a without difficulty. A plurality of holes 102a are arranged in a staggered arrangement in order to increase the volumetric energy density (i.e., capacitance per unit volume as a module) of the battery block.

Peripheral portion 102A of battery case 102 has a thickness larger than that at the central portion of battery case 102 (FIG. 1(b)). A number n of holes 102a adjacent to peripheral portion 102A are arranged along the longitudinal direction of battery case 102, and a number m of holes 102a adjacent to peripheral portion 102A are arranged along the lateral direction of battery case 102. Peripheral portion 102A has a thermal capacity corresponding to the total thermal capacity of 2×(n+m+1) unit cells (FIGS. 3(a) to 3(c)).

A plurality of through holes 103 are arranged between holes 102a of battery case 102. Through hole 103 is provided for reducing the weight of battery case 102, and has an approximately triangular sectional shape. Through hole 103 does not necessarily penetrate battery case 102.

As shown in FIG. 2, battery case 102 includes minimum thickness section 102b between hole 102a and through hole 103. Minimum thickness section 102b has a thickness of x (m). The thickness x of minimum thickness section 102b is found using the following Equation 1.

$$x \geq (\pi^2 \times \alpha \times D^2)/(36 \times \lambda) \times ((T1/T2) \times (A/A0) - 1) \quad \text{(Equation 1)}$$

Equation 1 is derived applying the conditions of this embodiment to the relationship "K2/K1≧K3−1".

As shown in FIG. 2, the heat emitted from an abnormally heated unit cell transfers from point X toward points Y1 and Y2 in battery case 102. The heat emitted from abnormally heated unit cell 101A also transfers to unit cell 101B while transferring through battery case 102. Accordingly, the amount of heat transferred to neighboring unit cell 101B can be represented by the thermal conductance of a part from point X to point Y1 of battery case 102 and the thermal conductance of a part from point X to point Y2 of battery case 102. In FIG. 2, point X indicates a halfway point between two through holes 103 residing between unit cells 101A and 101B. Points Y1 and Y2 indicate the halfway points between unit cells 101B and 101C respectively, and the halfway points between two through holes 103 and 103 residing between unit cells 101B and 101C. Unit cells 101C neighbor unit cell 101B and are other than unit cell 101A.

First, K1 will be derived. K1 is found by multiplying the heat transfer coefficient of the heat transfer path between battery case 102 and unit cell 101B by the cross-section area of the heat transfer path. Two members, one is air in the clearance between unit cell 101B and the inner surface of hole 102a and the other is a material of battery case 102, are present on the heat transfer path. Accordingly, the heat transfer coefficient α (W/(m²·K)) between unit cell 101B and battery case 102 is found by an experiment or calculation.

The cross-section area of the heat transfer path is a product between the length of hole 102a in the axial direction and length (La) of a part of the inner wall of hole 102a for accommodating therein unit cell 101B, the part receiving the heat from unit cell 101A. Note that in the battery block in this embodiment, the length of hole 102a and the length of battery case 102 in the axial direction are both constant. Accordingly, hereinafter, equations will be constructed without consideration of the length of hole 102a and the length of battery case 102. When it is supposed that the travel distances of heat emitted from unit cells 101 are the same as each other, length La of the inner wall equals to the length of a circular arc from point Y1 to point Y2, the inner wall receiving the heat emitted from unit cell 101A toward unit cell 101B. The outer diameter of unit cell 101 is D (m). The angle between the line connecting point Y1 and the center of unit cell 101B and the line connecting point Y2 and the center of unit cell 101B is 120°. Accordingly, the cross-section area of the heat transfer path is found as "π×D/3".

Therefore, $$K1 = \alpha \times \pi \times D/3 \tag{1}$$

Next, K2 will be derived. K2 is found by dividing the thermal conductivity of battery case 102 by the length of the heat transfer path of heat that transfers from unit cell 101A in battery case 102 without arriving unit cell 101B, and multiplying the resultant by the cross-section area of the heat transfer path.

Thermal conductivity of battery case 102 is defined as $\lambda(W/(m \cdot K))$.

There are two heat transfer paths, one is a heat transfer path from point X to point Y1 and the other is a heat transfer path from point X to point Y2. The length of each of the heat transfer paths is found as "π×D/6", because the outer diameter of unit cell 101 is D (m) and the angle between the line connecting point Y1 and the center of unit cell 101B and the line connecting point Y2 and the center of unit cell 101B is 120°. The cross-section area of the heat transfer path is width x (m) of minimum thickness section 102b, because the length of battery case 102 in the axial direction of unit cell 101 is not considered. The thermal conductance of each of the heat transfer paths is "6×λ×x/(π×D)." And also, there are two heat transfer paths. Accordingly, $$K2 = 12 \times \lambda \times x/(\pi \times D) \tag{2}$$

Next, K3 will be derived.

The abnormal heat generation is caused by a short circuit due to melting of the material of an inner section of the unit cell and by thermal reaction. The amount of heat generation in case of abnormal heat generation is proportional to the amount of electrode material of the unit cell, i.e. the cell capacity. Accordingly, the temperature of the abnormally heated unit cell is proportional to the ratio of the cell capacity of the unit cell to the cell capacity of the reference cell. The ambient temperature causing abnormal heat generation is determined by the physical properties of the electrode material and does not depend on the amount of the electrode material.

The abnormal heat temperature of the reference cell under room temperature is T1 (K). The ambient temperature causing abnormal heat generation in the reference cell is T2 (K). The cell capacity of unit cell 101 is A (Ah). The cell capacity of the reference cell is A0 (Ah). Accordingly, $$K3 = (T1/T2) \times (A/A0) \tag{3}$$

K1, K2 and K3 in Equations (1) to (3) are substituted into the equation "K2/K1≥K3−1" to derive Equation 1.

A larger thickness x (m) of minimum thickness section 102b facilitates heat transfer in battery case 102. However, if thickness x becomes larger than a certain extent, the effects of facilitating heat transfer in battery case 102 reach a limit. Because of such a reason, it is preferred that thickness x be 0.2 D or less in this embodiment.

It is preferred that the difference between the inner diameter of hole 102a and the outer diameter of unit cell 101 be 0.2 mm or less, from a viewpoint of increasing the packing density of accommodated unit cells 101.

Figure 3:
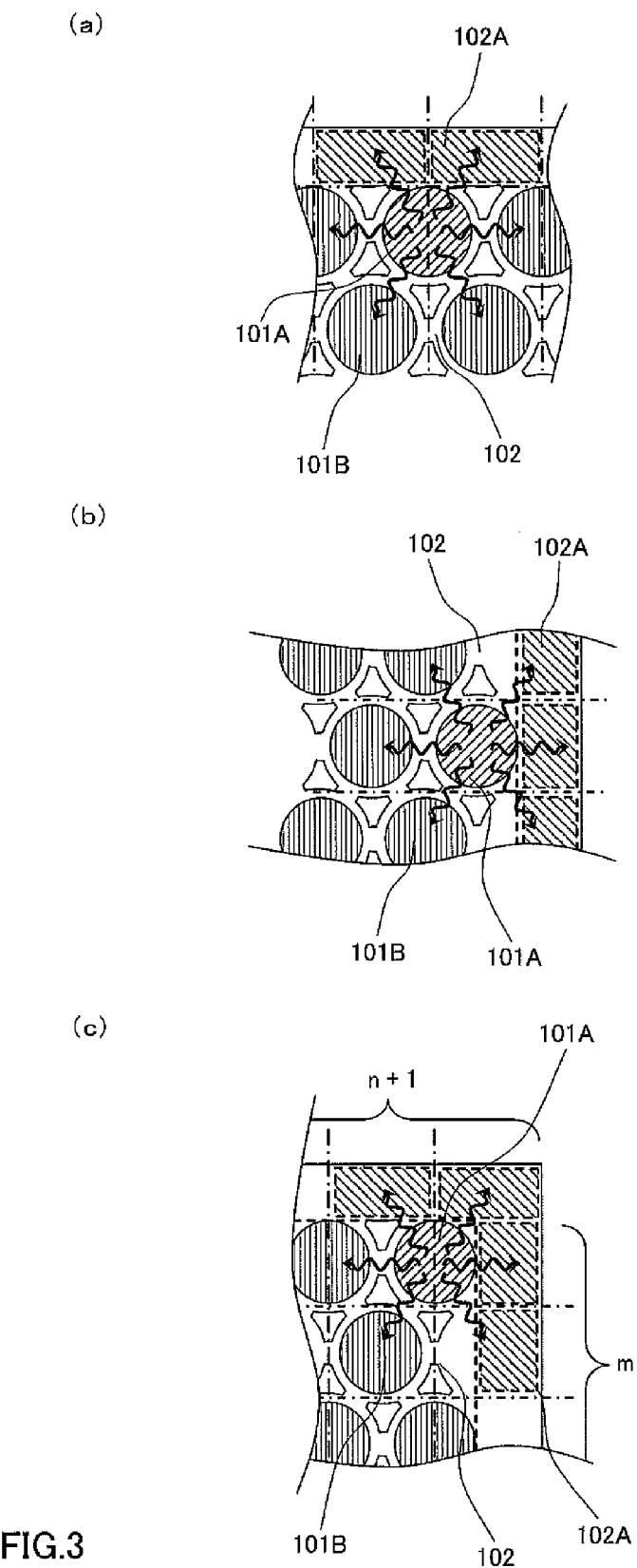
FIGS. 3(a) to (c) are diagrams showing the battery block of Embodiment 1.

Next, a flow of heat when abnormal heat generation occurs in unit cell 101 in the battery block will be described with reference to FIGS. 2 and 3.

FIG. 2 shows a flow of heat when abnormal heat generation occurs in one of the unit cells in the battery block shown in FIG. 1. In FIG. 2, reference sign 101A denotes an abnormally heated unit cell, and reference sign 101B denotes a unit cell neighboring unit cell 101A. The solid wiggly arrow indicates a flow of heat transferring from unit cell 101A to neighboring unit cell 101B. The broken wiggly arrow indicates a flow of heat transferring in battery case 102.

When abnormal heat generation occurs in a unit cell, uneven heat generation sometimes occurs owing to an internal short circuit or the like near the surface of the unit cell. In this case, the largest amount of heat is applied to the neighboring unit cell. FIG. 2 illustrates the case where abnormal heat generation occurs at a part in unit cell 101A and near unit cell 101B. As indicated by the wiggly arrow, heat emitted from abnormally heated unit cell 102A mainly transfers toward unit cell 101B, and diffuses through unit cell 101B and through parts surrounding unit cell 101B.

In the battery block in this embodiment, thickness x of minimum thickness section 102b of battery case 102 is found using Equation 1. As x becomes larger, the thermal resistance of the heat transfer path of the heat diffusing from unit cell 101A to battery case 102 through minimum thickness section 102b relatively becomes smaller than the thermal resistance of the heat transfer path from unit cell 101A to unit cell 101B. Accordingly, a large enough amount of heat emitted from unit cell 101A transfers through battery case 102. This reduces the amount of heat transferring to unit cell 101B. This reduction prevents abnormal heat generation from occurring in unit cell 101B. Accordingly, a chain reaction of degradations and abnormalities between unit cells 101 can be prevented.

FIG. 3(a) is an enlarged view of a peripheral portion on a long side of the battery block shown in FIG. 1(b). FIG. 3(b) is an enlarged view of a peripheral portion of the battery block shown in FIG. 1(b) on a short side. FIG. 3(c) is an enlarged view of a corner section between the peripheral portion on the long side and the peripheral portion on the short side. FIGS. 3(a) to 3(c) each show a flow of heat in case where a unit cell adjacent to the peripheral portion causes abnormal heat generation.

FIGS. 3(a) to 3(c) each show peripheral portion 102A imaginarily divided into portions each having a thermal capacity equal to the thermal capacity of unit cell 101B. Peripheral portion 102A is divided according to the flow of heat from unit cell 101A. As shown in FIG. 3(c), the number of divisions of peripheral portion 102A along the long side is n+1, where n is the number of unit cells along the long side. The number of divisions of peripheral portion 102A along the short side is m, where m is the number of unit cell along the short side. That is, the thermal capacity of entire peripheral portion 102A is equal to the total thermal capacity of 2×(n+m+1) unit cells. By this configuration, peripheral portion 102A as well as unit cell 101B neighboring abnormally heated unit cell 101A can absorb a heat generated by abnormal heat generation, even if the abnormal heat generation occurs in unit cell 101 near the peripheral portion 102A. This allows stable heat diffusion.

For instance, metal is suitable for the material of battery case 102. In particular, aluminum alloy is preferable because this alloy has a high thermal conductivity and good workability and is light in weight. Copper, which has a high thermal conductivity, is also preferable. The number of unit cells and the number of rows of unit cells to be arranged are not limited to those of the embodiment shown in FIG. 1.

A specific example will now be described.

Unit cells each having outer diameter D of 18 mm and cell capacity A of 2.6 Ah are inserted into respective holes of a battery case made of an aluminum alloy having a thermal conductivity λ of 200 W/(m·K), thereby constituting a battery block.

The heat transfer coefficient α between the unit cell and the battery case, as experimentally measured, was 300 W/(m²·K).

Figure 18:
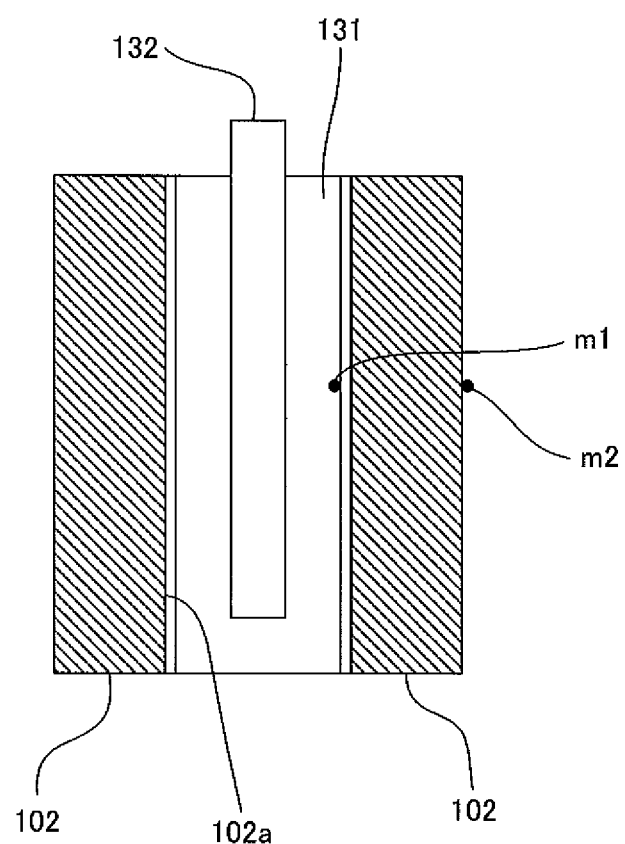
FIG. 18 is a diagram schematically showing an apparatus for measuring a heat transfer coefficient α.

Heat transfer coefficient α was found with a measurement apparatus shown in FIG. 18. First, empty unit cell case 131 was inserted into hole 102a of battery case 102. Heater 132 was inserted into unit cell case 131. Next, unit cell case 131 was heated by heater 132 from the inside of unit cell case 131. Temperature t1 [K] at measurement point m1 on unit cell case 131 was then measured with a thermocouple. Temperature t2 [K] at measurement point m2 on battery case 102 was measured by a thermocouple. Heat flux Q [W/m²] at measurement point m2 was measured by a heat flux meter. The found measurement values were substituted into the following equation to give the heat transfer coefficient α.

Heat transfer coefficient $\alpha = Q/(t1-t2)$

Furthermore, a nail penetration experiment and a heating experiment were performed with a reference cell. As a result, abnormal heat temperature T1 of the reference cell from room temperature was 370° C. Ambient temperature T2 at which abnormal heat generation occurs in the reference cell from room temperature was 140° C. The experiments show that the amount of heat where T2 is approximately 40% of T1 triggers abnormal heat generation in a neighboring unit cell.

The conditions were applied to Equation 1, and the thickness of minimum thickness section of the battery case was found as 0.22 mm.

Thus, battery case 102 was fabricated with thickness of the minimum thickness section set be 0.4 mm, so as to obtain the battery block of Embodiment 1. In a case where abnormal heat generation of unit cell 101A in battery case 102 was occurred, it was confirmed that abnormal heat generation did not occur in unit cell 101B neighboring abnormally heated unit cell 101A.

The battery block of this embodiment includes the minimum thickness section having a thickness of x found using Equation 1. This allows heat from the abnormally heated unit cell to be rapidly dispersed to the entire module without triggering abnormal heat generation in the neighboring unit cells.

Figure 6:
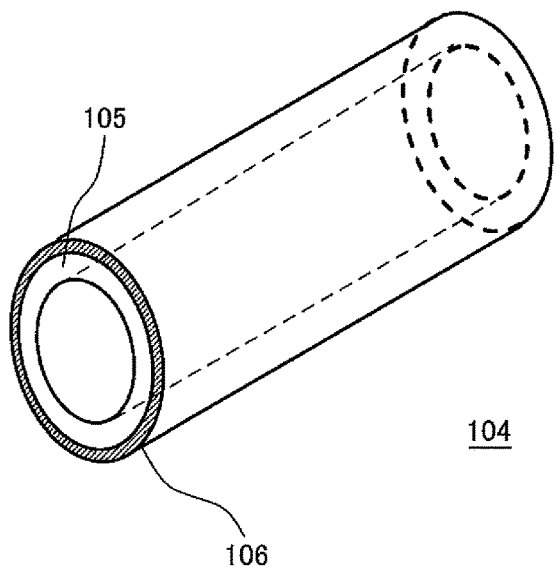
FIG. 6(a) is a diagram showing a cylindrical core constituting a battery case of Embodiment 1.
FIG. 6(b) is a diagram showing an arrangement of the cylindrical cores in the battery case manufactured.
Figure 6:
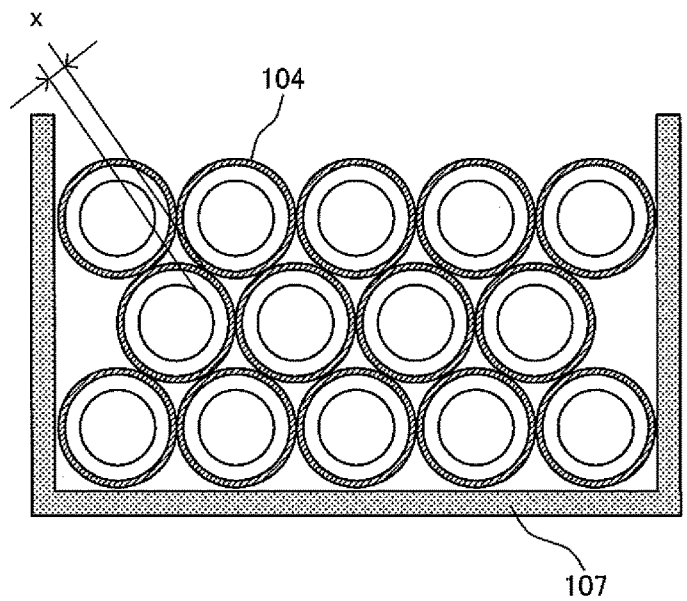

Next, a method of manufacturing the battery case in Embodiment 1 will be described with reference to FIG. 6.

Cylindrical material 104 shown in FIG. 6(a) is prepared. Cylindrical material 104 includes cylindrical core 105 made of metal, and connection layer 106 covering the outer surface of the core. Connection layer 106 is made of a metallic material having a lower melting point than that of a material of core 105.

Next, as shown in FIG. 6(b), cylindrical materials 104 are stacked in holding frame 107. Stacked cylindrical materials 104 are in contact with each other, and are arranged in a staggered manner. Next, cylindrical materials 104 are heated while being left in the staggered arrangement at a temperature between the melting point of core 105 and the melting point of connection layer 106 in a heating furnace or the like. Thereby, only connection layers 106 are melted so as to join cylindrical materials 104 to each other.

For instance, cylindrical material 104 is a brazing filler metal (commercially available). The brazing filler metal includes a core made of aluminum alloy A3003 and having a thickness of 1 mm, and an outer layer on the core, the outer layer as a brazing layer being made of aluminum alloy A4243 and having a thickness of 0.1 mm. The brazing filler metal stacked into the staggered arrangement are kept in a nitrogen atmosphere or in a vacuum at 610° C. for 5 minutes. By this heating, only aluminum alloy A4243 as connection layer 106 is melted. Thereby the brazing filler metal as cylindrical material are joined each other.

In the method of this embodiment, cylindrical materials 104 are stacked on their sides to join the materials to each other. By this method, the cylindrical materials 104 can be easily arranged in the staggered manner. Furthermore, this method can accurately maintain the staggered arrangement of cylindrical materials 104. In this embodiment, the brazing filler metal is adopted as connection layer 106. However, a layer made of another material, such as resin, may be adopted.

By the method of this embodiment, the battery case in the battery block of this embodiment can be manufactured at a lower cost.

Embodiment 2

Figure 7:
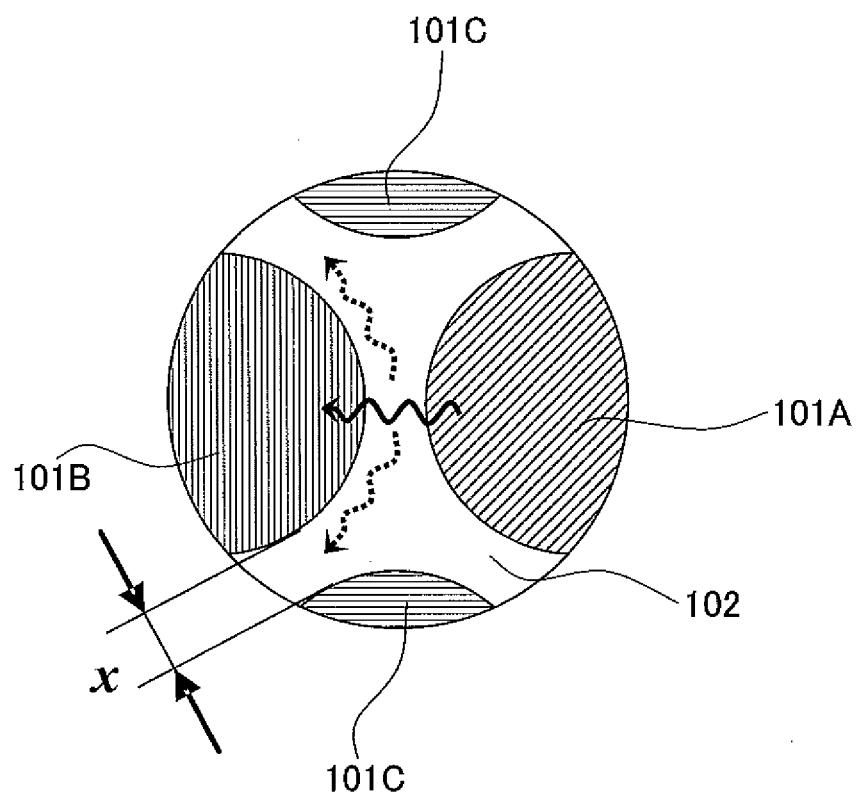
FIG. 7 is an enlarged top view schematically showing a battery block of Embodiment 2.

Embodiment 2 will now be described with reference to FIG. 7. FIG. 7 is an enlarged top view around abnormally heated unit cell 101A in the battery block of Embodiment 2.

The battery block of this embodiment has a configuration analogous to that of Embodiment 1 except that the battery block of this embodiment does not have through hole 103. Thickness x of minimum thickness section 102b of battery case 102 in this embodiment is a thickness between unit cells 101B and 101C. Thickness x of minimum thickness section 102b in this embodiment is found using Equation 1 as with Embodiment 1.

Battery case 102 in this embodiment can be arranged such that the distances between the unit cells are reduced in comparison with the battery case in Embodiment 1. This arrangement can further improve the volumetric energy density of the battery block. As with Embodiment 1, the heat from an abnormally heated unit cell can be rapidly dispersed to the entire module without triggering abnormal heat generation in the neighboring unit cells.

Figure 8:
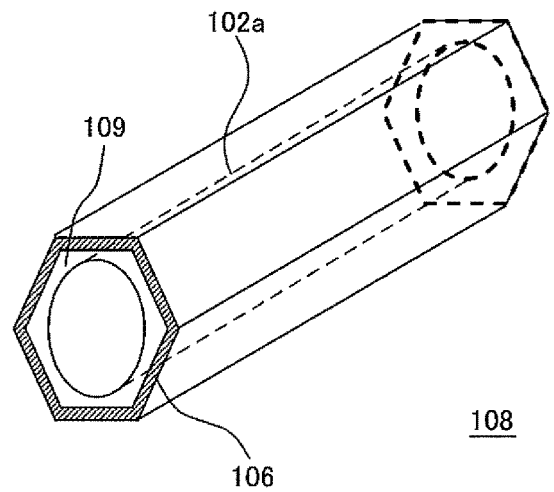
FIG. 8(a) is a diagram showing a hexagonal cylindrical core constituting a battery case of Embodiment 2.
FIG. 8(b) is a diagram showing arrangement of the hexagonal cylindrical cores in the battery case manufactured.
Figure 8:
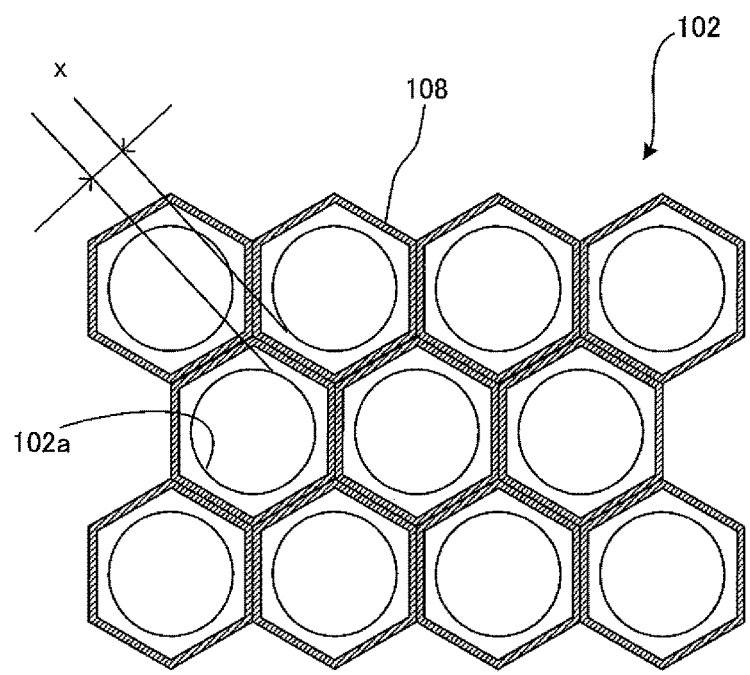

A method of manufacturing a battery case in Embodiment 2 will be described with reference to FIG. 8.

First, hexagonal columnar material 108 shown in FIG. 8(a) is prepared. Hexagonal columnar material 108 includes core 109 that is a hexagonal cylinder having circular hole 102a, and connection layer 106 covering the core 109. The material of core 109 is, for instance, aluminum alloy. Connection layer 106 is, for instance, a layer made of brazing filler metal. Next, hexagonal columnar materials 108 are stacked into layers as shown in FIG. 8(b). As with Embodiment 1, a holding frame regulates stacked hexagonal columnar materials 108. Next, stacked hexagonal columnar materials 108 are heated in a heating furnace or the like, thereby melting only connection layer 106. As a result, hexagonal columnar materials 108 are joined to each other, so as to obtain battery case 102.

In this manufacturing method, the sides of hexagonal columnar materials 108 are in contact with each other so as to regulate the positions of hexagonal columnar materials 108. Thus, a plurality of holes 102a into which respective unit cells 101 are to be inserted can be disposed in the staggered arrangement.

Alternatively, the battery case in this embodiment can be manufactured by subjecting metal to extrusion molding, cutting, electro-discharge machining or the like. In comparison with these alternative methods, by the above described manufacturing methods, battery case 102 can be manufactured at a lower cost.

Embodiment 3

Figure 9:
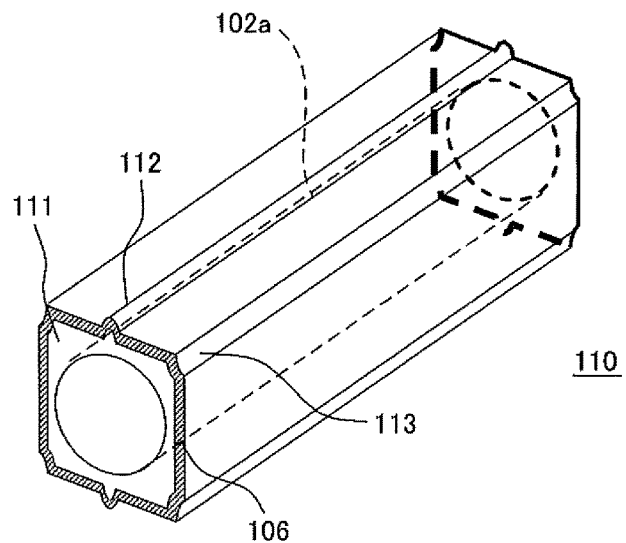
FIG. 9(a) is a diagram showing a quadrilateral cylindrical core constituting a battery case of Embodiment 3.
FIG. 9(b) is a diagram showing arrangement of the quadrilateral cylindrical cores in the battery case manufactured.
Figure 9:
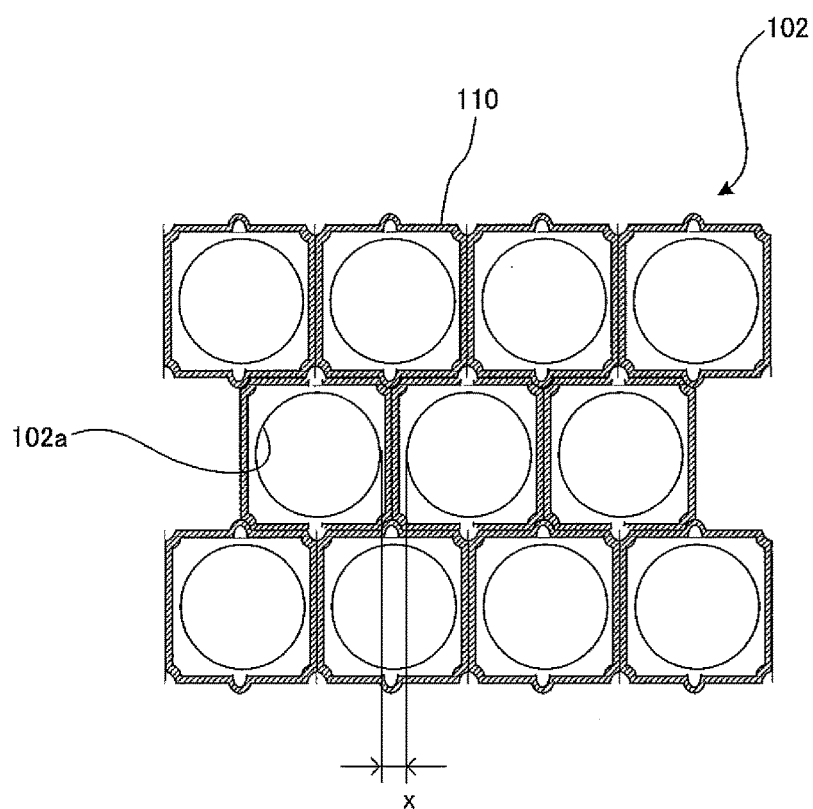

Embodiment 3 will be described with reference to FIG. 9. FIG. 9 is a diagram showing a method of manufacturing a battery case of Embodiment 3. FIG. 9(a) shows quadrilateral columnar material 110 as a rod into which one unit cell can be inserted. FIG. 9(b) is a side view showing a battery case in which quadrilateral columnar materials 110 are stacked, in view of the direction in which the unit cells are to be inserted.

As shown in FIG. 9(a), quadrilateral columnar material 110 includes: core 111 as a quadrilateral cylinder having circular hole 102a; convex portions 112 formed on the respective centers of a pair of side walls of core 111, convex portions 112 being along a longitudinal direction of core 111; concave portions 113 at which four edges of core 111 are notched along the longitudinal direction of core 111; and connection layer 106 covering core 111. Concave portion 113 is formed such that one convex portion 112 is fitted in a part configured with two concave portions 113 of two quadrilateral columnar materials 110 which are arrange side by side.

Quadrilateral columnar materials 110 are stacked as shown in FIG. 9(b). In the drawing, the sides of quadrilateral columnar materials 110 are in contact with each other. Convex section 112 on the center on the side wall of quadrilateral columnar material 110 is fitted in a part configured with two concave portions 113 of two quadrilateral columnar materials 110 which neighbor to each other. Thus, quadrilateral columnar materials 110 are arranged in a staggered manner. As with Embodiment 1, stacked quadrilateral columnar materials 110 are regulated by a holding frame. Next, connection layers 106 are heat-melted in a heating furnace or the like, thereby joining quadrilateral columnar materials 110 to each other, so as to obtain battery case 102.

In this manufacturing method, convex portions 112 are fitted in concave portions 113 to thereby regulate the positions of quadrilateral columnar materials 110. Thus, holes 102a into which respective unit cells 101 are inserted can be precisely arranged in the staggered manner.

Embodiment 4

Embodiment 4 will be described with reference to FIG. 10.

Figure 10:
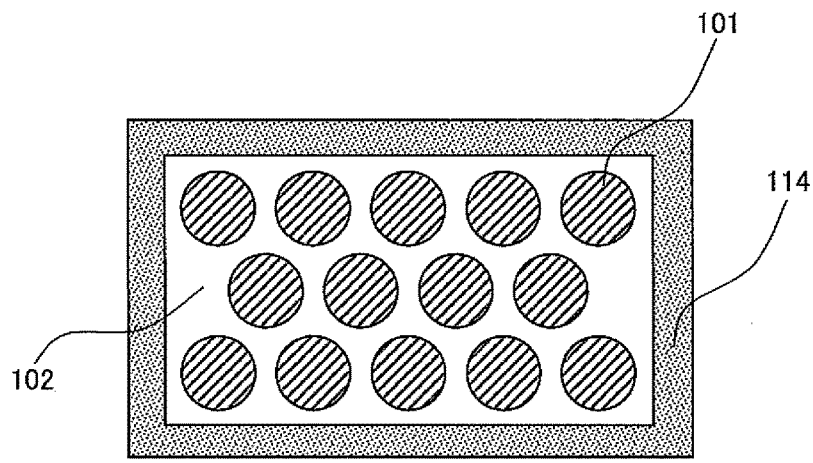
FIG. 10 is a top view schematically showing a battery block of Embodiment 4.

FIG. 10 is a top view schematically showing a battery block of Embodiment 4. Reference sign 114 denotes an outer frame made of a material different from that of battery case 102, the outer frame accommodating battery case 102 therein. The battery block of this embodiment is configured as with Embodiment 1 except that peripheral portion 102A includes outer frame 114. In the case where n holes 102a along the horizontal direction and m holes 102a along the vertical direction are arranged in battery case 102, outer frame 114 has a thermal capacity equal to the total thermal capacity of 2×(n+m+1) unit cells. The material of outer frame 114 is, for instance, a resin or a metal such as a magnesium alloy.

In the case of using a battery block as a power source, particularly in the case of connecting many battery blocks for obtaining a high voltage and large current output, risks of an electric shock and ignition due to a short circuit arise. Thus, the battery block is required to be insulated with an external member. In this case, an insulator such as resin is preferable as the material of outer frame 114. By this configuration, an insulating layer covering the outer surface of battery case 102 is formed.

A battery block as a power source for an automobile is required to be light in weight and have an excellent heat releasing capability to expand drive range. In this case, a magnesium alloy or the like, which has a low density and a high thermal conductivity, is preferable for the material of outer frame 114.

Even if abnormal heat generation occurs in a unit cell at a position adjacent to the peripheral portion of the battery case, the battery block of this embodiment can rapidly disperse the heat from the abnormally heated unit cell to the entire module without triggering abnormal heat generation in neighboring unit cells. The battery block of this embodiment further includes multiple functions, such as insulation, reduction in weight and high thermal conductivity.

Embodiment 5

Embodiment 5 will be described with reference to FIG. 11.

Figure 11:
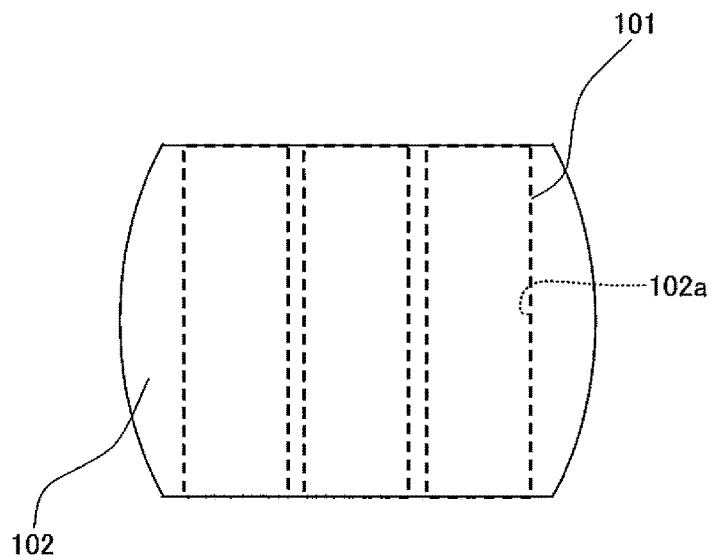
FIG. 11 is a side view schematically showing a battery block of Embodiment 5.

FIG. 11 is a side view schematically showing a battery block of Embodiment 5. In this embodiment, a thickness of the peripheral portion of battery case 102 is small at both ends in the axial direction of hole 102a, and is large at a central portion in the axial direction of hole 102a. The thermal capacity of the peripheral portion is equal to the thermal capacity of peripheral portion 102A of the battery case in Embodiment 1. The battery block is configured as with Embodiment 1 except for the shape of the peripheral portion.

In case where abnormal heat generation occurs in unit cell 101, unit cell 101 also emits heat in upward and downward directions in the drawing. A heat in the central portion in the axial direction of battery case 102 is relatively difficult to be released in comparison with a heat in the ends of the axial direction of battery case 102. Accordingly, the temperature at the central portion of battery case 102 may increase and cause temperature variation across battery case 102 so as to degrade battery performance.

In the battery block of this embodiment, the thermal capacity of battery case 102 is large at the central portion of hole 102a in the axial direction. Accordingly, the heat from the central portion of unit cell 101 tends to be released more, which can reduce more the temperature at the central portion of unit cell 101. In battery case 102 in this embodiment, the thermal capacity of the peripheral portion is equal to the total thermal capacity of all unit cells 101 arranged adjacent to the peripheral portion. Accordingly, the energy density does not reduce, although thickness of the peripheral portion at the center increases.

Even if abnormal heat generation occurs in a unit cell positioned adjacent to the peripheral portion of the battery block, the heat from the abnormally heated unit cell can be dispersed to the entire module evenly and rapidly without triggering abnormal heat generation in the neighboring unit cells. Furthermore, the battery block of this embodiment can reduce temperature variation across battery case 102 in the axial direction of hole 102a.

Embodiment 6

Embodiment 6 will be described with reference to FIG. 12.

Figure 12:
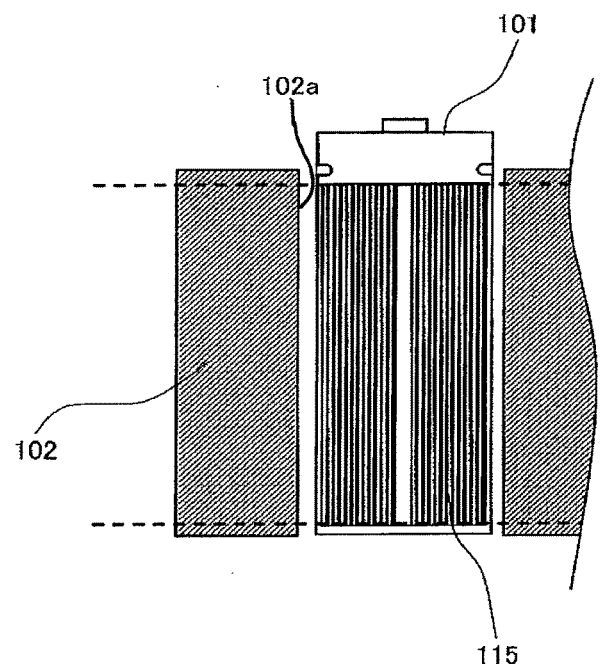
FIG. 12 is an enlarged view showing an insertion section for a unit cell of the battery block of Embodiment 6.

FIG. 12 is a sectional view of a battery block of Embodiment 6. Reference sign 115 denotes an electrode assembly arranged in unit cell 101. In electrode assembly 115, a positive electrode, a negative electrode, and a separator insulating these electrodes are stacked, wound and inserted into a circular cylindrical case.

The broken lines in the drawing indicate positions at upper and lower ends of electrode assembly 115 in the axial direction. Hole 102a is longer than electrode assembly 115 of unit cell 101 in the axial direction. The battery block of this embodiment is configured as with Embodiment 1 except that the length of hole 102a is set as described above.

Abnormal heat generation is typically caused by abnormality such as a short circuit in electrode assembly 115, and therefore large heat generation is generated in electrode assembly 115. Whole of electrode assembly 115 of unit cell 101 is covered in a radial direction with battery case 102 of this embodiment. Thus, in the battery case in this embodiment, entire electrode assembly 115 is accommodated in hole 102a. Accordingly, the heat can be effectively dispersed in this case.

The heat from an abnormally heated unit cell can be rapidly and effectively dispersed to the entire module of the battery block of this embodiment without triggering abnormal heat generation in neighboring unit cells.

Embodiment 7

Embodiment 7 will be described with reference to FIG. 13.

Figure 13:
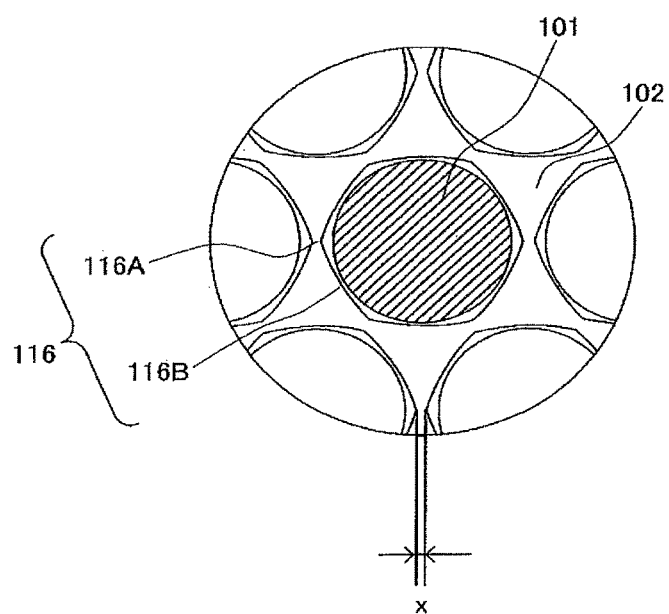
FIG. 13 is an enlarged top view schematically showing a battery block of Embodiment 7.

FIG. 13 is an enlarged top view schematically showing a battery block of Embodiment 7. FIG. 13 shows a state where unit cell 101 is inserted into hole 116. The battery block of this embodiment is configured as with Embodiment 1 except for having hole 116 instead of hole 102a. Hole 116 has a hexagonal shape including six apex portions 116A, and six side portions each connecting two apex portions 116A and having the same length. Holes 116 are arranged such that two apex portions 116A of the hexagons of two neighboring holes 116 face each other. The outer surface of unit cell 101 can be in contact with side portions 116B but is apart from apex portions 116A. Accordingly, between unit cells 101 neighboring each other, there is a clearance between apex portion 116A and unit cell 101.

Hole 116 has a hexagonal shape. Accordingly, in the case of accommodating unit cells 101 in respective holes 116 arranged in a staggered manner, the clearances having the same size are arranged between all neighboring unit cells 101, a staggered manner being the most closed-packed arrangement. The clearance is between the outer surface of unit cell 101 and apex portion 116A.

Unit cell 101 can be in contact with the inner wall of hole 116 on side portion 116B but can not be in contact at apex portion 116A. The contact between unit cell 101 and side portion 116B secures heat transfer between unit cell 101 and battery case 102. Unit cell 101 and apex portion 116A are not in contact with each other, and two holes 116 are arranged such that apex portions 116A face each other. Accordingly, there are two clearances on the line connecting two holes 116, the clearance being between apex portion 116A and unit cell 101. Thus, the heat to be transferred from certain unit cell 101 to neighboring unit cell 101 passes through the two clearances. As a result, heat transfer from certain unit cell 101 to neighboring unit cells 101 is reduced. In case where abnormal heat generation occurs in unit cell 101, a heat transfer of the heat of abnormal heat generation to the neighboring unit cells can be reduced, and therefore the heat of abnormal heat generation can be rapidly dispersed to the entire module in the battery block of this embodiment.

Embodiment 8

Embodiment 8 will be described with reference to FIG. 14.

Figure 14:
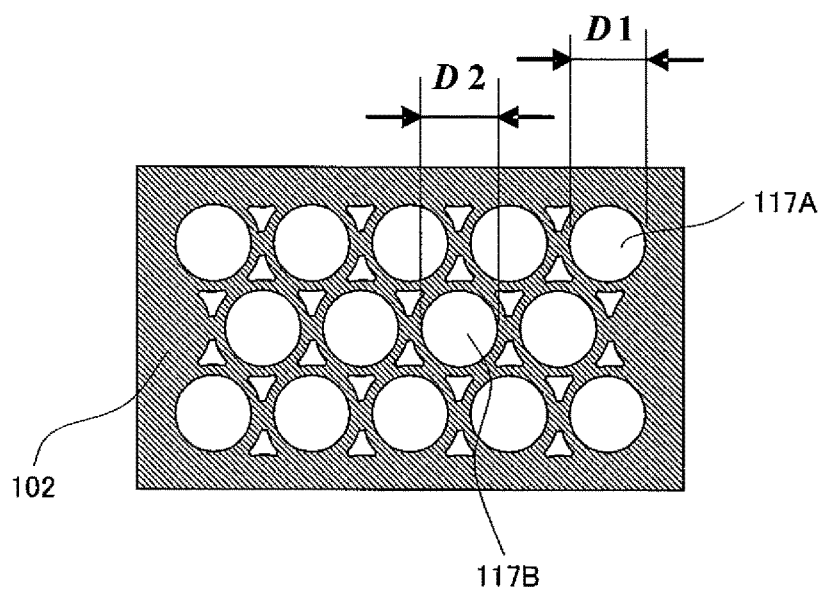
FIG. 14 is a top view of a battery case of Embodiment 8.

FIG. 14 is a top view of a battery case of Embodiment 8. In FIG. 14, battery case 102 includes holes 117A in contact with the peripheral portion of battery case 102, and holes 117B disposed at a central portion inside thereof. Inner diameter D1 of hole 117A is larger than inner diameter D2 of hole 117B by approximately 0.1 mm. The outer diameter of each of unit cells accommodated in respective holes 117A and 117B is D (m). The battery block of this embodiment has a configuration analogous to that of Embodiment 1 except that the inner diameter of hole 117A is different from the inner diameter of hole 117B.

In the battery block of this embodiment, the clearance between hole 117A arranged at the peripheral portion of battery case 102 and unit cell 101 is larger than the clearance between hole 117B arranged at the central portion and unit cell 101. Accordingly, the thermal resistance between hole 117A and unit cell 101 is larger than the thermal resistance between hole 117B and unit cell 101. If abnormal heat generation occurs in a unit cell adjacent to the peripheral portion, a heat in the peripheral portion of battery case 102 is typically difficult to be diffused, and therefore large amount of the heat tends to transfer to neighboring unit cells. In the battery block of this embodiment, the heat transfer between unit cell accommodated in hole 117A and battery case 102 is more reduced than the heat transfer between unit cell accommodated in hole 117B and battery case 102. The heat from an abnormally heated unit cell can be rapidly and effectively dispersed to the entire module of the battery block of this embodiment without inducing abnormal heat generation in the neighboring unit cells, even if the abnormally heated unit cell is arranged at the peripheral portion, Embodiment 9

Embodiment 9 will be described with reference to FIG. 15.

Figure 15:
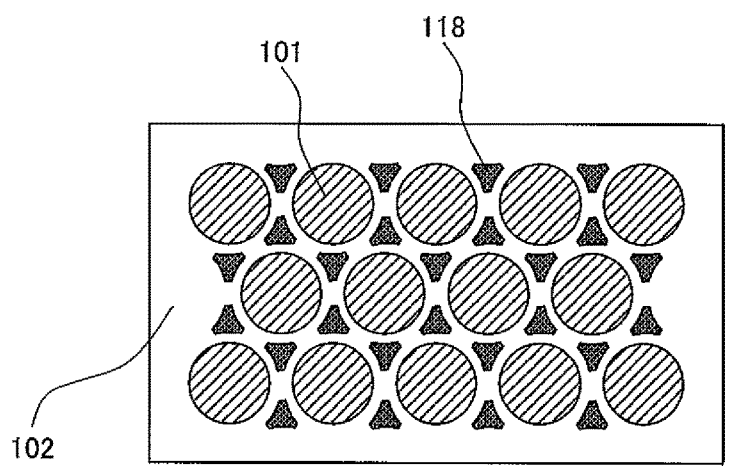
FIG. 15 is a top view schematically showing a battery block of Embodiment 9.

FIG. 15 is a top view schematically showing a battery block of Embodiment 9. In FIG. 15, battery case 102 further includes components 118 made of a metallic material different from the metallic material of battery case 102. The battery block of this embodiment has a configuration analogous to that of Embodiment 1 except for further including components 118. Component 118 is constructed by filling through holes 103 of battery case 102 in Embodiment 1 with the metallic material.

The material of component 118 is, for instance, a magnesium alloy, copper or the like, in the case where the battery case is made of an aluminum alloy. Component 118 made of a magnesium alloy can achieve thermal conductivity, and further, can improve weight and resistance to vibrations in comparison with the case of an aluminum alloy. Component 118 made of copper improves thermal conductivity and increases the thermal capacity. Accordingly, the amount of heat transfer from battery case 102 to the unit cell is reduced.

The heat from an abnormally heated unit can be rapidly and efficiently dispersed to the entire module of the battery block of this embodiment, without triggering abnormal heat generation in the neighboring unit cells. Furthermore, the battery block of this embodiment can have effects caused by the material of component 118.

Battery case 102 in this embodiment can be manufactured by modifying the manufacturing method of Embodiment 1, i.e., by furthermore inserting rods made of the above different material into clearances among stacked cylindrical materials 104, and by subsequently heat-melting connection layers 106. By the heat-melting, an alloy or a compound on the interfaces between connection layers 106 and the rods is produced. Instead, cylindrical materials 104 and the rods are integrated through thermocompression bonding.

Embodiment 10

Embodiment 10 will be described with reference to FIG. 16.

Figure 16:
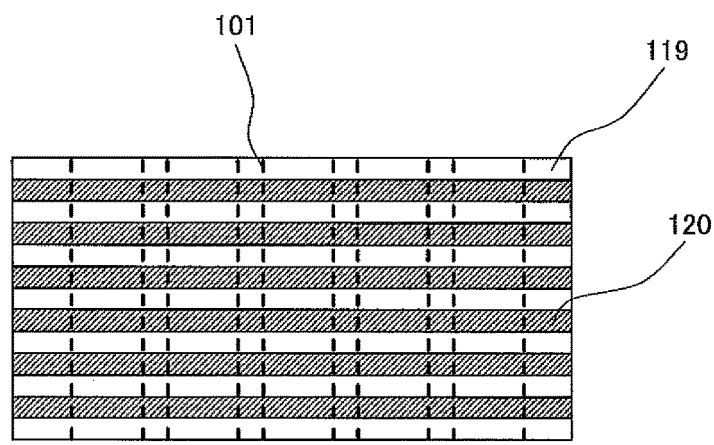
FIG. 16 is a side view schematically showing a battery block of Embodiment 10.
Figure 17:
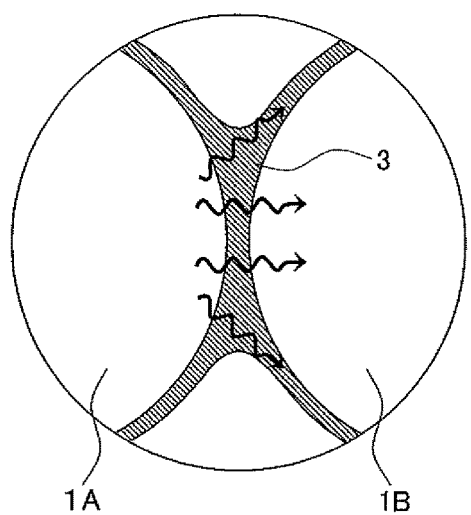
FIG. 17 is a conceptual diagram showing heat transfer in a conventional battery block.

FIG. 16 is a side view schematically showing a battery block of Embodiment 10. In FIG. 16, battery case 102 has a stacked structure including plates 119 made of highly thermally conductive metal and plates 120 made of metal other than that of plate 119. The battery block of this embodiment has a configuration analogous to that of Embodiment 1 except that battery case 102 has the stacked structure. The material of plate 119 is, for instance, an aluminum alloy. The material of plate 120 is, for instance, a metallic material other than that of the battery case described in Embodiment 9. As with Embodiment 1, the heat from an abnormally heated unit cell can be rapidly and effectively dispersed to the entire module of the battery block of this embodiment, without triggering abnormal heat generation in the neighboring unit cells. Furthermore, the battery block enabling multiple advantageous effects of improvement in thermal conductivity, resistance to vibrations and reduction in weight can be provided.

The battery case of this embodiment can be manufactured by: boring holes into which the unit cells can be inserted in plates by means of pressing or cutting, the plate being made of metal or the like and provided with connection layers on the surfaces; stacking the plates to obtain an assembly; and heating and melting the connection layers of the assembly using a heating furnace or the like. The plates are integrated via an alloy or compound formed on the interface between the plates. Alternately, by thermocompression bonding of the plates, the plates can be integrated. The connection layers may be formed on the respective surfaces of the plates in which the holes had been bored.

The disclosure of Japanese Patent Application No. 2011-058825, filed on Mar. 17, 2011, including the specification, drawings and abstract, is incorporated herein by reference in its entirety.

INDUSTRIAL APPLICABILITY

Even if abnormal heat generation occurs in a unit cell, the heat generated by the abnormal heat generation can be rapidly and effectively diffuse to the entire module of the battery block of the present invention, without triggering abnormal heat generation in the neighboring unit cells. Thereby, a chain reaction of degradations and abnormalities of the unit cells can be prevented. The battery block of the present invention is applicable to drive power sources for automobiles, electric motorcycles and electric appliances, and electricity storage apparatuses and the like.

REFERENCE SIGNS LIST 1A, 1B secondary battery
3 wall
101, 101A, 101B, 101C unit cell
102 battery case
102a, 116, 117A, 117B hole
102b minimum thickness section
102A peripheral portion
103 through hole
104 cylindrical material
105, 109, 111 core
106 connection layer
107 holding frame
108 hexagonal columnar material
110 quadrilateral columnar material
112 convex portion
113 concave portion
114 outer frame
115 electrode assembly
116A apex portion
116B side portion
118 component
119, 120 plate
131 case of unit cell
132 heater
D outer diameter of unit cell
D1 inner diameter of hole 117A
D2 inner diameter of hole 117B
m1, m2 measurement point
x thickness of minimum thickness section

The invention claimed is:
1. A battery block comprising:
a battery case made of metal and having a plurality of holes; and
a plurality of unit cells accommodated in the respective holes, wherein
a minimum thickness section of the battery case between any two of the holes neighboring each other satisfies the following relationship:

$$K2/K1 \geq K3-1$$

where K1 is a thermal conductance between any one of the unit cells and the battery case,
K2 is a thermal conductance of the minimum thickness section,
K3 is a ratio of an abnormal heat temperature of a reference cell under room temperature to ambient temperature causing abnormal heat generation in the reference cell under room temperature, the abnormal heat temperature is defined as a temperature caused by a short circuit within the unit cell, the battery case comprises a plurality of circular cylinders joined to each other, the cylinders each having the holes, and the cylinders each include a cylindrical core made of metal, and a metallic material covering an outer surface of the core and having a lower melting point than that of a material of the core.

2. The battery block according to claim 1, wherein an arrangement of the plurality of holes is a staggered arrangement, a shape of the unit cell is a circular cylinder, and the following relationship expressed by Equation 1 is satisfied:

$$x \geq (\pi^2 \times \alpha \times D^2)/(36 \times \lambda) \times ((T1/T2) \times (A/A0) - 1) \quad \text{(Equation 1)}$$

where A0 (Ah) is a cell capacity of the reference cell,

T1 (K) is the abnormal heat temperature of the reference cell under room temperature, T2 (K) is ambient temperature causing abnormal heat generation in the reference cell under room temperature, A (Ah) is a cell capacity of the unit cell, D (m) is an outer diameter of the unit cell, $\alpha$ (W/(m$^2$·K)) is a heat transfer coefficient between the unit cell and an inner wall of the hole, $\lambda$ (W/(m·K)) is a thermal conductivity of the battery case, and x (m) is a thickness of the minimum thickness section.

3. The battery block according to claim 1, wherein a thickness of a peripheral portion of the battery case is larger than a thickness of a central portion of the battery case.

4. The battery block according to claim 1, wherein the battery case has m rows of the holes, each row having n holes at a peripheral portion, and a thermal capacity of the peripheral portion of the battery case is equal to a total thermal capacity of 2×(n+m+1) unit cells.

5. The battery block according to claim 1, wherein a thickness of a peripheral portion of the battery case at a center in an axial direction of the hole is larger than a thickness of the peripheral portion at an end in the axial direction.

6. The battery block according to claim 1, wherein the unit cell includes an electrode assembly, a length of the hole is larger than a length of the electrode assembly, and at least the entire electrode assembly is accommodated in the hole.

7. The battery block according to claim 1, further comprising:

convex portions arranged on outer walls of the cylinders; and concave portions arranged on the outer walls of the cylinders, the concave portions being contoured such that the convex portions can be fitted therein.

8. The battery block according to claim 1, wherein a shape of the hole is a polygon, and the holes are disposed such that two apexes respectively of any two of the holes neighboring face each other.

9. The battery block according to claim 1, wherein an area of an opening of the hole arranged at a peripheral portion of the battery case is larger than an area of an opening of the hole arranged at a central portion of the battery case.

10. The battery block according to claim 1, wherein the battery case is made of an aluminum alloy.

11. The battery block according to claim 1, wherein the battery case includes at least two different components made of different metallic materials.

12. The battery block according to claim 1, further comprising an insulating layer that covers an outer surface of the battery case.

* * * * *